United States Patent
Maekawa

[11] Patent Number: 6,012,831
[45] Date of Patent: Jan. 11, 2000

[54] VEHICLE LAMP HAVING A CURVED PORTION AND RECURSIVE ELEMENTS

[75] Inventor: Gen Maekawa, Shizuoka, Japan

[73] Assignee: Koito Manufacturing Co., Ltd., Tokyo, Japan

[21] Appl. No.: 09/019,705

[22] Filed: Feb. 6, 1998

[30] Foreign Application Priority Data

Feb. 10, 1997 [JP] Japan ................................. 9-026657

[51] Int. Cl.$^7$ .................. F21V 7/00; F21Q 1/00
[52] U.S. Cl. ................ 362/546; 362/518; 362/544
[58] Field of Search .................... 362/546, 543, 362/544, 517, 518

[56] References Cited

U.S. PATENT DOCUMENTS

| | | | |
|---|---|---|---|
| 4,774,637 | 9/1988 | Budde et al. | 362/544 X |
| 4,972,303 | 11/1990 | Machida et al. | 362/80 |
| 5,448,454 | 9/1995 | Nonaka | 362/546 |
| 5,526,247 | 6/1996 | Sugiyama | 362/517 |
| 5,566,057 | 10/1996 | Iwami | 362/61 |

FOREIGN PATENT DOCUMENTS

| | | |
|---|---|---|
| 0 024 580 | 3/1981 | European Pat. Off. . |
| 2 436 693 | 4/1980 | France . |
| 144 028 | 8/1980 | Germany . |

OTHER PUBLICATIONS

British Search Report (Apr. 23, 1998).

*Primary Examiner*—Laura K. Tso
*Attorney, Agent, or Firm*—Morgan, Lewis & Bockius LLP

[57] ABSTRACT

A vehicle lamp includes a lens attached to a lamp body, the lens including a curved portion, a circumferential wall-like attachment rib projecting from an inner surface of the curved portion of the lens and having an even projection height, and a sealing plate having a circumferential edge portion and a cover portion on an inner side of the circumferential edge portion for ultrasonically welding a welding portion formed in the circumferential edge portion to the attachment rib, and a reflection portion including a plurality of recursive reflection elements formed in a space defined by the lens, the attachment rib and the sealing plate, wherein a pressed portion extends from the circumferential edge portion in a direction opposite to the lens, the pressed portion being adapted to be pressed against a vibrating portion of an ultrasonic welding apparatus and formed in the sealing plate so that a forward end surface of the pressed portion is located in the same plane.

6 Claims, 5 Drawing Sheets

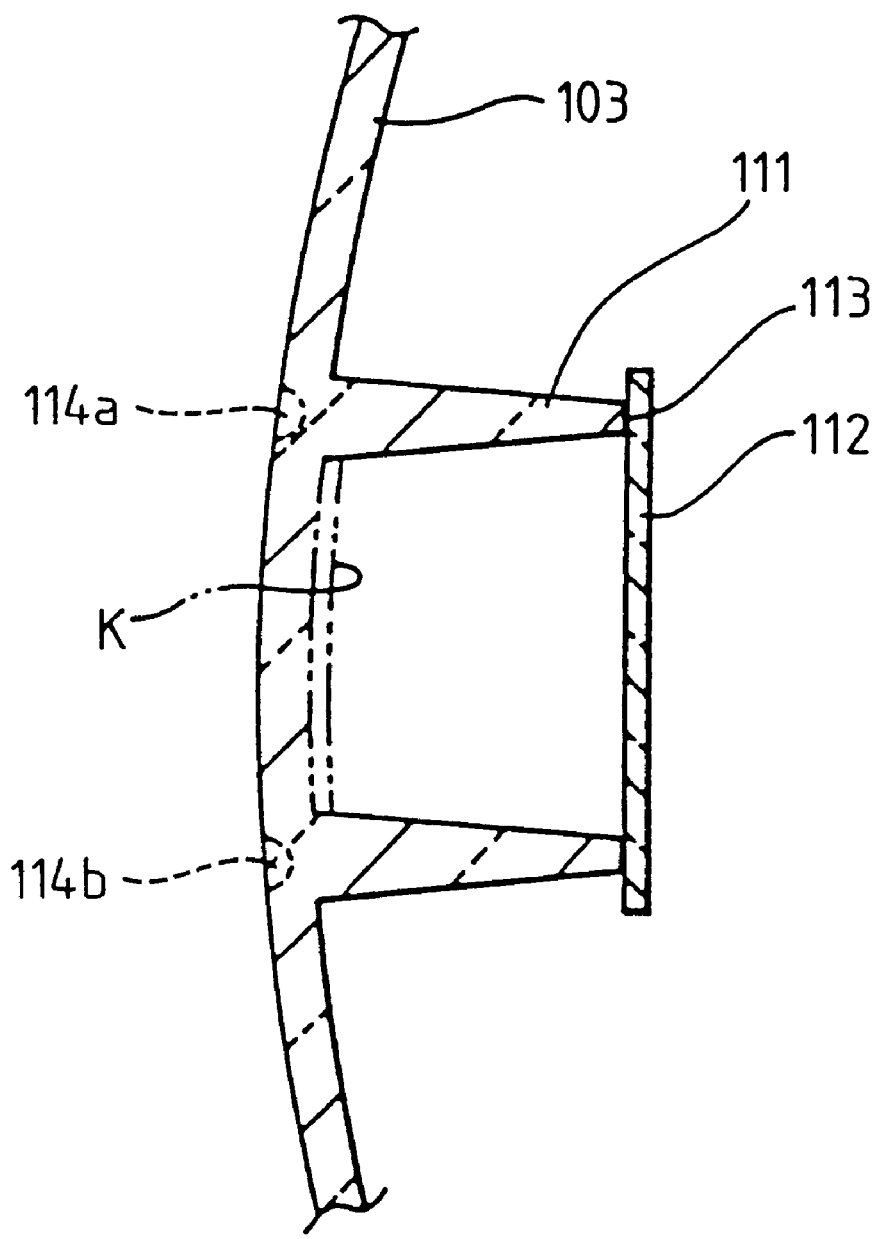

VEHICLE LAMP HAVING A CURVED PORTION AND RECURSIVE ELEMENTS

This application claims the benefit of Japanese Patent Application No. Hei. 9-26657, filed Feb. 10, 1997, which is hereby incorporated by reference.

BACKGROUND OF THE INVENTION

The present invention relates to a vehicle lamp, and more particularly, to prevention of surface sinkage during cooling at a time of formation of a vehicle lamp lens and to improvement in external appearance of a vehicle lamp lens.

Discussion of the Related Art

A widely used vehicle lamp has a reflection portion including recursive reflection elements formed as a part of a lens to cover an opening of a lamp body. Such a vehicle lamp is widely used, for example, as a rear combination lamp of a car, or the like.

FIGS. 6 and 7 show an example of a conventional vehicle lamp. The vehicle lamp 100 includes a vessel-shaped lamp body 101, a lens 103 covering an opening 102 of a lamp body 101, and a reflector 106 in a lamp chamber 104. The lamp chamber 104 is defined by the lamp body 101 and the lens 103. The reflector 106 reflects light from light sources 105a, 105b, and includes left and right reflecting portions 107a, 107b. The left and right reflecting portions 107a, 107b are connected to each other through a connection portion 108.

The lens 103 is shaped as an outwardly-convex gently curved surface. A reflection portion 110 includes a large number of recursive reflection elements 109 and is formed in an inner surface of the lens 103 at a portion corresponding to the connection portion 108. A circumferential wall-like attachment rib 111 projects from an outer circumference of the reflection portion 110. A flat plate-like sealing plate 112 is attached to the attachment rib 111 by ultrasonic welding. The sealing plate 112 prevents a reduction in effectiveness of the recursive reflection elements 109 by preventing entry and deposition of water and dust.

A forward end surface 113 of the attachment rib 111 must be located in the same plane. The forward end surface 113 is an attachment surface to which the sealing plate 112 must be attached, and the attachment surface is pressed through the flat plane-like sealing plate 112 by a flat end surface of a vibration portion (ultrasonic welding horn) of an ultrasonic welding apparatus at the time of welding.

Further, the conventional vehicle lamp 100 is configured so that the amount of projection of the attachment rib 111 is changed to partially correspond to the curvature of the lens 103 so that the attachment surface 113 is located in the same plane. That is, as shown in FIG. 7, the attachment rib 111 is formed so that the amount of projection of the attachment rib 111 increases approaching the laterally central portion, and decreases approaching each of the laterally opposite end portions from the laterally central portion.

If the amount of projection of the attachment rib 111 in the laterally central portion is larger than that in the other portion, the base end portion of the attachment rib 111 must be thicker than the forward end portion of the attachment rib 111. This allows the thickness of the attachment surface 113 to be made even over its entire circumference, because it is necessary to provide a release angle in the mold-releasing direction at the time of molding. Accordingly, only the laterally central portion of the lens 103 in the portion corresponding to the attachment rib 111 appears expanded in a vertical dimension (see FIG. 8) when the lens 103 is observed from the outside. Therefore, appearance of the vehicle lamp is poor.

Further, particularly in the laterally central portion, there arises a problem when so-called surface sinkage is easily generated in outer portions 114a, 114b (see FIG. 9) of the lens 103 (corresponding to the attachment rib 111). This occurs during cooling at the time of formation of the lens 103 because the base end portion is thick and the amount of projection of the base end portion of the attachment rib 111 from the inner surface of the lens 103 is large, so that the mass increases.

SUMMARY OF THE INVENTION

Accordingly, the present invention is directed to a vehicle lamp that obviates one or more of the problems and disadvantages of the related art.

An object of the present invention is to provide a vehicle lamp without any surface sinkage during cooling at the time of formation of a lens.

Another object of the present invention is to improve an external appearance of the lens.

Additional features and advantages of the present invention will be set forth in the description which follows, and will be apparent from the description, or may be learned by practice of the invention.

The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a vehicle lamp, including a lens attached to a lamp body, the lens including a curved portion, a circumferential wall-like attachment rib projecting from an inner surface of the curved portion of the lens and having an even projection height, and a sealing plate having a circumferential edge portion and a cover portion on an inner side of the circumferential edge portion for ultrasonically welding a welding portion formed in the circumferential edge portion to the attachment rib, and a reflection portion including a plurality of recursive reflection elements formed in a space defined by the lens, the attachment rib and the sealing plate, wherein a pressed portion extends from the circumferential edge portion in a direction opposite to the lens, the pressed portion being adapted to be pressed against a vibrating portion of an ultrasonic welding apparatus and formed in the sealing plate so that a forward end surface of the pressed portion is located in the same plane.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 9 is a sectional view illustrating another problem in the conventional vehicle lamp.

DETAILED DESCRIPTION OF THE PREFERRED EMBODIMENTS

Reference will now be made in detail to the preferred embodiments of the present invention, examples of which are illustrated in the accompanying drawings.

Figure 1:
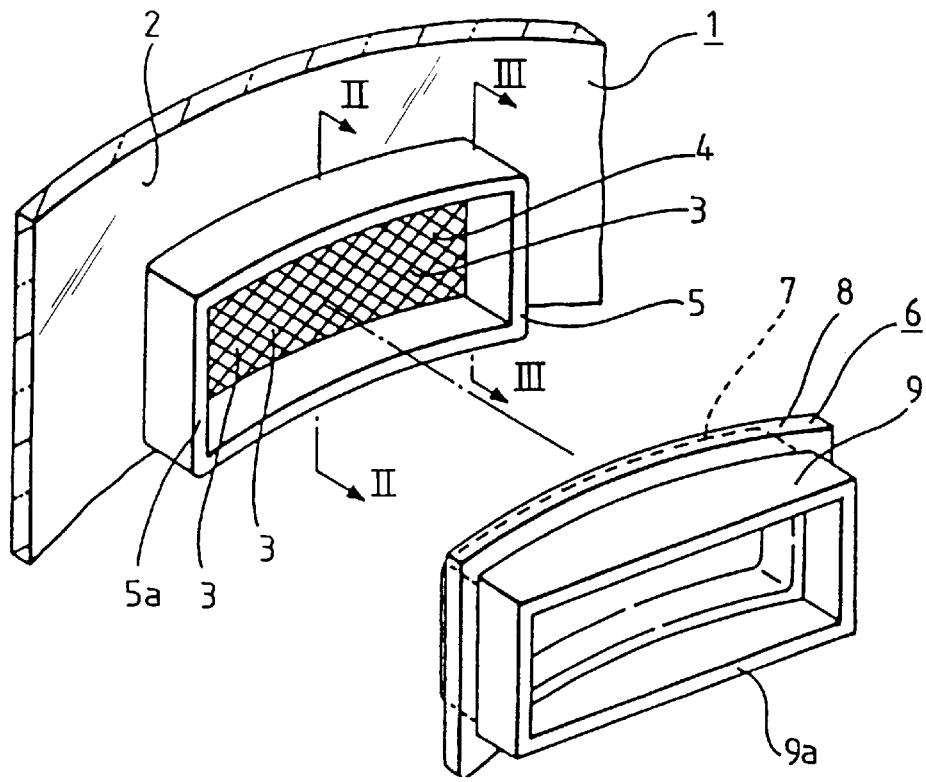
FIG. 1 shows a first embodiment of a vehicle lamp according to the present invention.

As shown in FIG. 1, illustrating a first preferred embodiment of the present invention, a lens 1 is formed of a transparent synthetic resin. An opening of a lamp body (not shown) is covered with the lens 1. An outward-convex gently curved portion 2 is formed in the lens 1. A large number of recursive reflection elements 3 are formed as part of an inner surface of the lens 1, thereby forming a reflection portion 4. A circumferential wall-like attachment rib 5 projects from the inner surface of the lens 1 to surround a circumferential edge of the reflection portion 4.

Externally, the attachment rib 5 is shaped as laterally long rectangle. The amount of projection of the attachment rib 5 from the inner surface of the lens 1 is even for the entire circumference of the attachment rib 5. Accordingly, a forward end surface 5a, that is, an attachment surface, is formed as a gently curved surface corresponding to the curved portion 2, so that a sealing plate 6 (described below) can be attached to the attachment surface 5a.

The sealing plate 6 is integrally formed of a resin material and has a cover portion 7, a flange-like circumferential edge portion 8, and a pressed portion 9.

The cover portion 7 is shaped as a shallow box open in a direction opposite the lens 1. The cover portion 7 is formed so that its external size is slightly smaller than an inner size of the attachment rib 5, and so that the surface opposite the reflection portion 4 is formed as a gently curved surface corresponding to the curved portion 2.

The flange-like circumferential edge portion 8 is provided in the edge of the opening of the cover portion 7. The flange-like circumferential edge portion 8 is shaped as a plate with a rectangular external shape to form a gently curved surface corresponding to the attachment surface 5a of the attachment rib 5. A surface of the flange-like circumferential edge portion 8 on a cover portion side is a welding portion 8a for welding the circumferential edge portion 8 to the attachment surface 5a.

A pressed portion 9 projects from a surface of the circumferential edge portion 8 on an opposite side of the welding portion 8a. The pressed portion 9 is a frame having a laterally-elongated rectangular external shape. The external shape of the pressed portion 9 is substantially the same as that of the attachment rib 5. A forward end surface 9a that presses against a vibrating portion of an ultrasonic welding apparatus (described below) is located in the same plane (see FIG. 1). That is, the amount of projection of the pressed portion 9 is maximum at a laterally central portion (see FIGS. 1 and 2) and decreases approaching left and right sides (see FIGS. 2 and 3). The circumferential thickness of the pressed portion 9 is smaller than that of the circumferential edge portion 8 (see FIGS. 2 and 3).

The sealing plate 6 is attached to the attachment rib 5 by ultrasonic welding as follows. The welding portion 8a is brought into contact with the attachment surface 5a. When the cover portion 7 is fitted into the attachment rib 5, a vibration portion of an ultrasonic welding apparatus (not shown) is pressed against the pressed surface 9a so that the attachment surface 5a and the welding portion 8a are melted and welded to each other by heat caused by the ultrasonic vibration generated between the attachment surface 5a and the welding portion 8a. Accordingly, the forward end portion of the attachment rib 5 and the circumferential edge portion 8 are welded to each other. Thus, the attachment of the sealing plate 6 is completed. When the sealing plate 6 is welded to the attachment rib 5 as described above, a closed space 10 is formed enclosed by the inner surface of the lens 1, the attachment rib 5 and the cover portion 7 of the sealing plate 6 (see FIGS. 2 and 3).

Because the welding portion 8a is provided over the entire circumference of the circumferential edge portion 8, there is no gap between the attachment surface 5a and the welding portion 8a. Accordingly, the closed space 10 cannot be invaded by water and dust from the outside, and the recursive reflection elements 3 are never degraded.

Because the amount of projection of the attachment rib 5 from the inner surface of the lens 1 is even over the entire circumference of the attachment rib 5, the thickness of the base end portion is also even over the entire circumference, improving the external appearance of the lens 1.

Further, because the thickness of the base end portion of the attachment rib 5 is even over the entire circumference so that the amount of projection of the attachment rib 5 from the inner surface of the lens 1 does not change locally, surface sinkage rarely occurs in the outer portion of the lens 1 corresponding to the attachment rib 5 during cooling at the time of formation of the lens 1.

Further, in the first preferred embodiment, the recursive reflection elements 3 are integrally formed on the inner surface of the lens 1. In such integral formation, a release angle for releasing molds at the time of formation of the lens 1 becomes large. However, if the amount of projection of the attachment rib 5 is small, the release angle can be reduced accordingly. Thus, because the circumferential thickness of the attachment rib 5 changes very little, surface sinkage rarely occurs in the outer portion of the lens 1 corresponding to the attachment rib 5.

Further, when the surface of the cover portion 7, which is opposite the reflection portion 4 is a gently curved surface corresponding to the curved portion 2 as described above, the volume of the closed space 10 can be reduced compared to a planar surface.

Accordingly, the amount of air in the closed space 10 is small, so that the lens 1 is only minimally deformed due to expansion of air, even if the temperature rises when the lamp (not shown) is on.

Further, because the cover portion 7 projects from the circumferential edge portion 8 toward the lens 1 side, the volume of the enclosed space 10 can be reduced correspondingly. Accordingly, the lens 1 is only minimally deformed due to the expansion of air even if the temperature rises.

In addition, because the sealing plate 6 is formed so that the radial thickness of the pressed portion 9 is smaller than that of the circumferential edge portion 8, surface sinkage rarely occurs in the welding portion 8a at the time of formation of the sealing plate 6.

Figure 4:
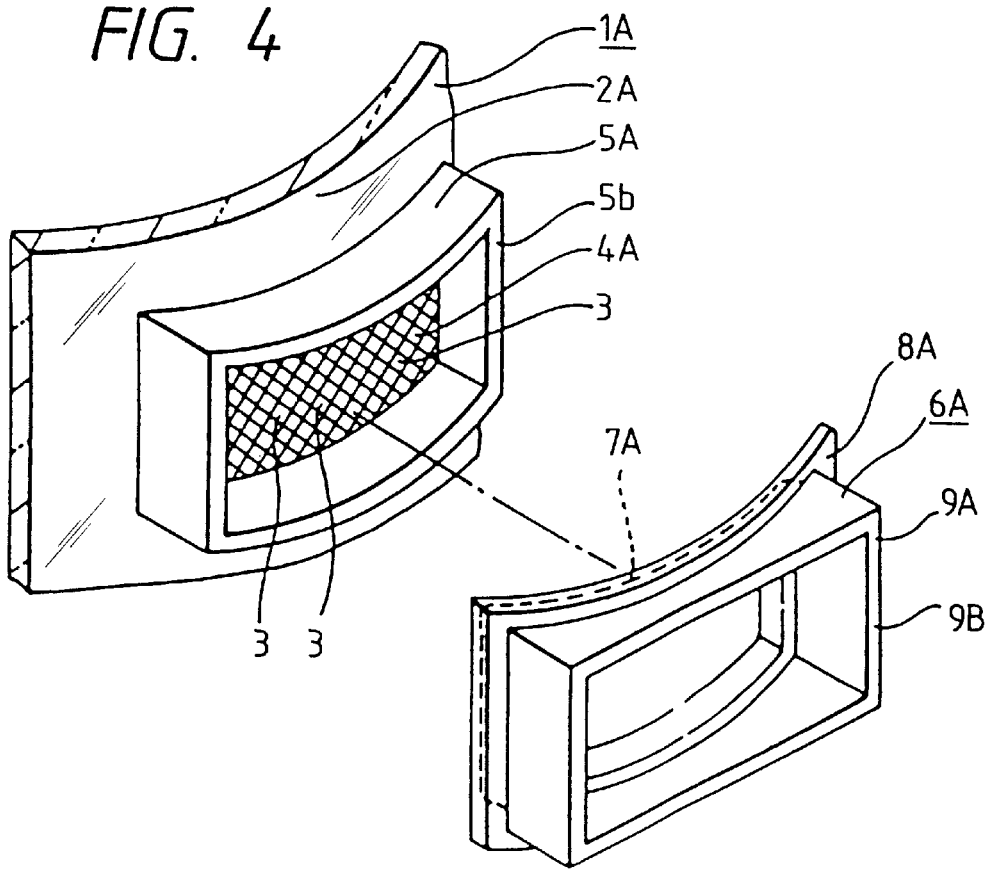
FIG. 4 is an exploded perspective view of the present invention showing a second embodiment of the present invention.

A second embodiment will now be described with reference to FIG. 4. The second embodiment is different from the first embodiment in that a lens 1A is formed having an outward-convex gently curved surface so that attachment surfaces of an attachment rib 5 and a sealing plate 6A are formed to correspond to the curved surface of the lens 1A. Accordingly, only differences between the second and first embodiments will be described in detail, while equivalent parts have corresponding reference numerals, and their further description is omitted.

An outward-concave gently curved portion 2A is formed in the lens 1A. A large number of recursive reflection elements 3 are formed as a part of an inner surface of the curved portion 2A to form a reflection portion 4A. The circumferential wall-like attachment rib 5A projects from the inner surface of the lens 1A, surrounding a circumferential edge of the reflection portion 4A.

The amount of projection of the attachment rib 5A is even over its entire circumference, similar to the first embodiment. Accordingly, an attachment surface 5b of the attachment rib 5A is a gently curved surface corresponding to the curved portion 2A.

A cover portion 7A of the sealing plate 6A has a surface opposite the reflection portion 4A formed as a gently curved surface corresponding to the curved portion 2A.

A pressed portion 9A is formed to have a pressed surface 9b located in the same plane, similar to the first embodiment. That is, the amount of projection of the pressed portion 9A projecting from the circumferential edge portion 8A is minimum at a laterally central portion and increases approaching each of left and right sides. The sealing plate 6A is attached to the attachment rib 5A by ultrasonic welding.

Thus, because the amount of projection of the attachment rib 5A is even over its entire circumference, the external appearance of the lens 1A is improved and surface sinkage rarely occurs in the outer portion of the lens 1A corresponding to the attachment rib 5A during cooling.

Figure 5:
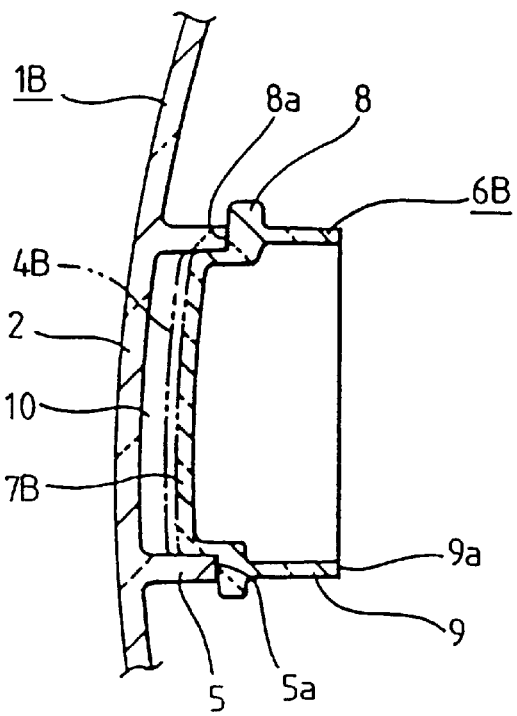
FIG. 5 is a sectional view showing a third embodiment of the present invention.
Figure 6:
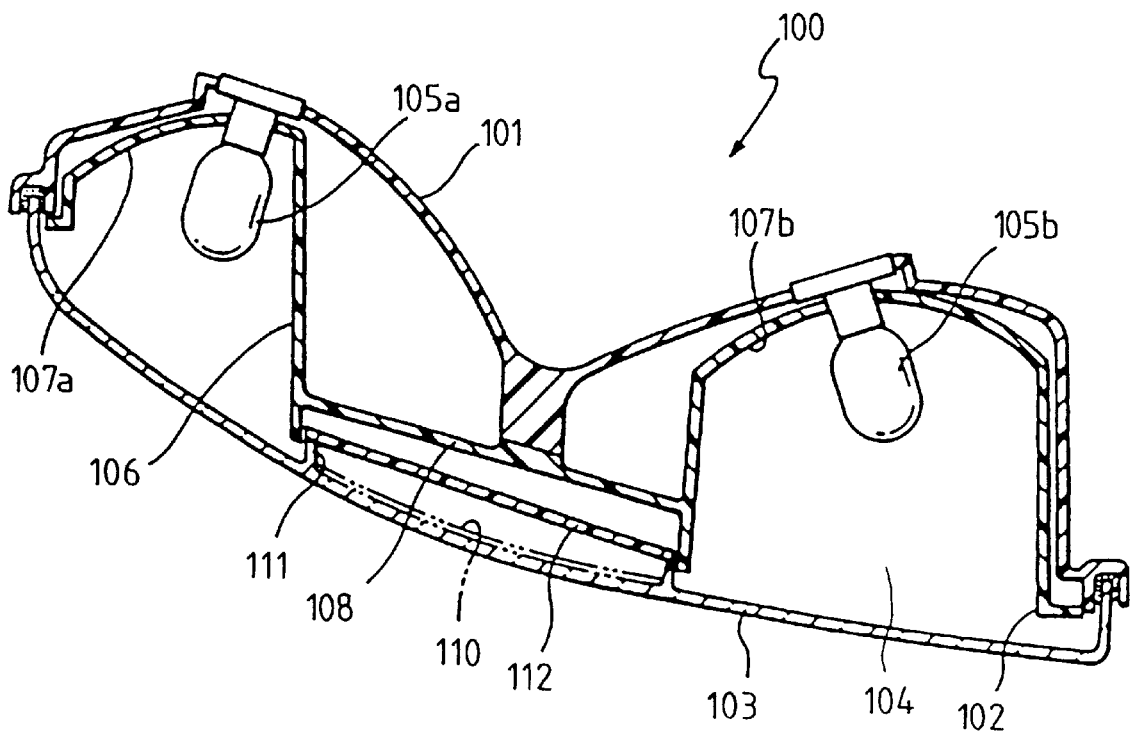
FIG. 6 shows a horizontal sectional view of a conventional vehicle lamp.
Figure 7:
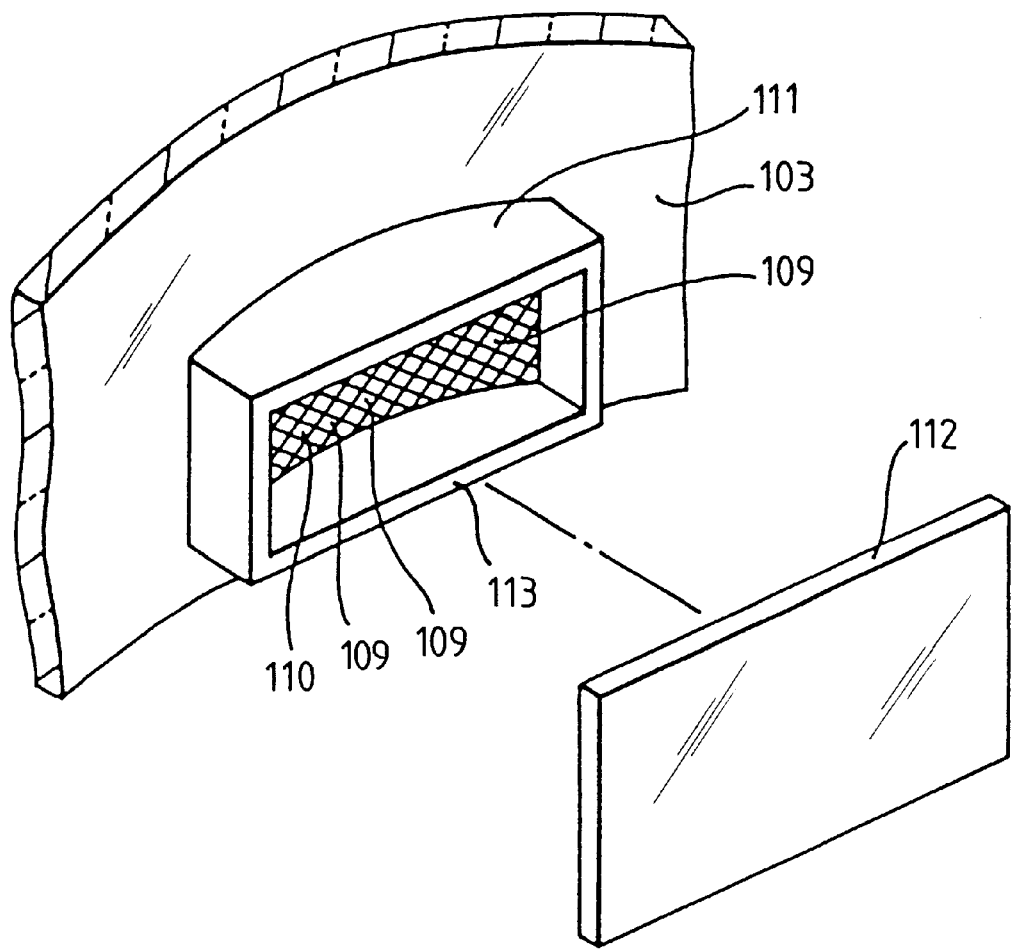
FIG. 7 is a perspective view showing an attachment rib and a sealing plate of a conventional vehicle lamp.
Figure 8:
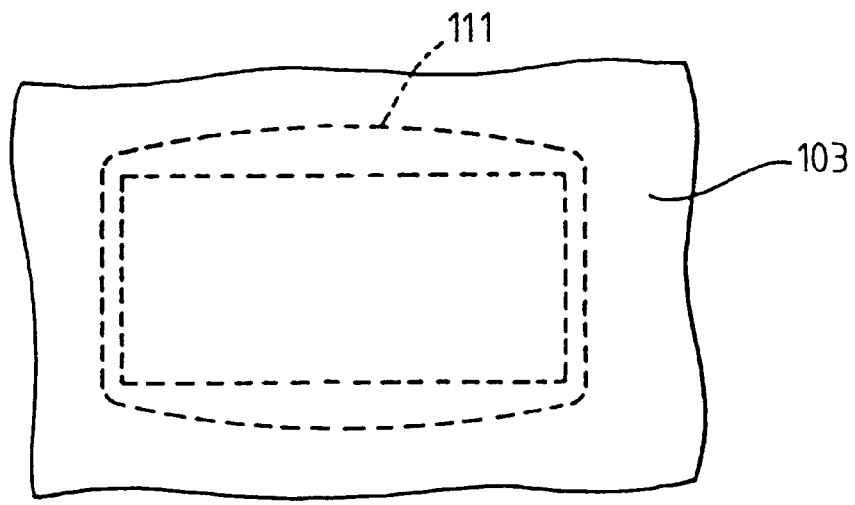
FIG. 8 is a sectional view illustrating a problem in the conventional vehicle lamp.

A third embodiment will be described with reference to FIG. 5. The third embodiment differs from the first embodiment in that recursive reflection elements are formed in a sealing plate. Accordingly, only the differences between the third and first embodiments will be described in detail, while description of equivalent parts having the same reference designations is omitted.

A sealing plate 6B is formed of a transparent material. Recursive reflection elements 3 are formed in a surface of a cover portion 7B of the sealing plate 6B opposite the lens 1B, thereby forming a reflection portion 4B.

Although the reflection portion 4B is formed not on the inner surface of the lens 1B but on the sealing plate 6B, the same effect as in the first embodiment results, and there is no risk of degradation of the recursive reflection elements 3 due to water or dust.

Further, the thickness of the base end portion of the attachment rib 5a is even over the entire circumference. Thus, the quantity of projection of the attachment rib 5a from the inner surface of the lens 1B does not change, and surface sinkage rarely occurs in the outer portion of the lens 1B corresponding to the attachment rib 5a during cooling at the time of formation of the lens 1B.

Further, the welding portion 8a is formed over the entire circumference of the circumferential edge portion 8. Accordingly, there is no gap between the attachment rib 5a and the sealing plate 6 and closed space 10 cannot be invaded by water and dust from the outside.

Further, the recursive reflection elements 3 are integrally formed in the inner surface of the lens 1, which means the release angle for releasing molds becomes large. But, if the amount of projection of the attachment rib 5a is small, the release angle can be reduced, and surface sinkage occurs only minimally in the outer portion of the lens 1 corresponding to the attachment rib 5a, because the circumferential thickness of the attachment rib 5a changes little.

Further, the cover portion of the sealing plate 6 is formed as a gently curved surface corresponding to the curved portion 2 of the lens 1 to reduce the volume of the enclosed space 10. Accordingly, the amount of air in the closed 10 space is small, and the lens 1 is only minimally deformed due to the expansion of enclosed air even if the temperature of the enclosed air rises.

Further, the cover portion of the sealing plate 6 projects from the circumferential edge portion 8 to the lens side. Accordingly, the volume of the closed space 10 can be reduced, and the lens 1 (or 1A or 1B) is only minimally deformed due to the expansion of air even if the temperature of the enclosed air rises.

Figure 2:
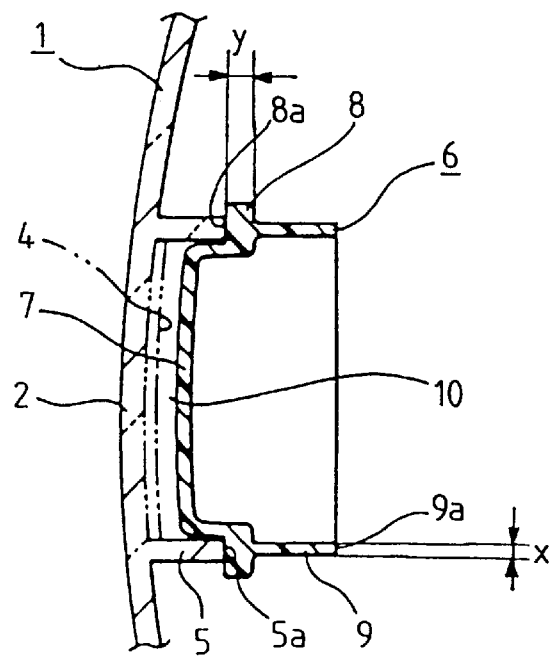
FIG. 2 is a sectional view along line II—II of FIG. 1 showing a sealing plate attached to an attachment rib.
Figure 3:
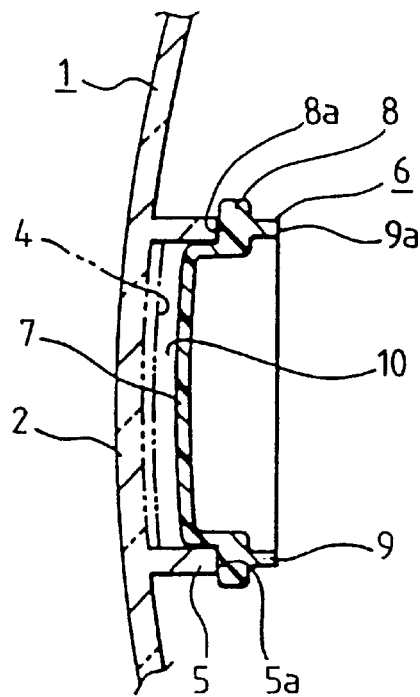
FIG. 3 is a sectional view along line III—III of FIG. 1 showing the sealing plate attached to the attachment rib.

In addition, as shown in FIG. 2, the sealing plate 6 has a radial thickness x in its pressed portion 9 which is smaller than a radial thickness y in its circumferential edge portion 8. Accordingly, surface sinkage rarely occurs in the welding portion side surface at the time of formation of the sealing plate 6.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A vehicle lamp, comprising:
a lens attached to a lamp body, the lens including:
   a curved portion;
   a circumferential wall-like attachment rib projecting from an inner surface of the curved portion of the lens and having an even projection height; and
   a sealing plate having a circumferential edge portion and a cover portion on an inner side of the circumferential edge portion for ultrasonically welding a welding portion formed in the circumferential edge portion to the attachment rib; and
a reflection portion including a plurality of recursive reflection elements formed in a space defined by the lens, the attachment rib and the sealing plate,
wherein a pressed portion extends from the circumferential edge portion in a direction opposite to the lens, the pressed portion being adapted to be pressed against a vibrating portion of an ultrasonic welding apparatus and formed in the sealing plate so that a forward end surface of the pressed portion is located in the same plane.

2. A vehicle lamp according to claim 1, wherein the welding portion is formed over an entire circumference of the circumferential edge portion.

3. A vehicle lamp according to claim 1, wherein the plurality of recursive reflection elements are integrally formed on the inner surface of the curved portion of the lens.

4. A vehicle lamp according to claim 1, wherein the cover portion is a curved surface corresponding to the curved portion of the lens.

5. A vehicle lamp according to claim 1, wherein the sealing plate includes the cover portion projecting from the circumferential edge portion to a lens side.

6. A vehicle lamp according to claim 1, wherein a radial thickness of the pressed portion is smaller than a radial thickness of the circumferential edge portion.

* * * * *